US010372268B2

(12) United States Patent
Tachibana et al.

(10) Patent No.: US 10,372,268 B2
(45) Date of Patent: Aug. 6, 2019

(54) SPATIAL IMAGE DISPLAY APPARATUS AND SPATIAL IMAGE DISPLAY METHOD

(71) Applicant: Sony Mobile Communications Inc., Tokyo (JP)

(72) Inventors: Makoto Tachibana, Tokyo (JP); Tsuyoshi Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 177 days.

(21) Appl. No.: 14/805,007

(22) Filed: Jul. 21, 2015

(65) Prior Publication Data

US 2017/0024082 A1 Jan. 26, 2017

(51) Int. Cl.
G06F 3/041 (2006.01)
G06F 3/042 (2006.01)

(52) U.S. Cl.
CPC .......... G06F 3/0421 (2013.01); G06F 3/0412 (2013.01); G06F 3/0416 (2013.01); G06F 2203/04101 (2013.01)

(58) Field of Classification Search
CPC ........ G06F 3/0421; G06F 3/042; G06F 3/041; G06F 3635/18; G06F 3/017; G02B 27/2235; G02B 27/2242; G02B 27/2292; G02B 27/2271; G02B 27/24; G02B 21/2066; G02B 21/28; G02B 5/0816; G02B 5/08; G02B 5/124; G02B 5/30; G02F 1/00; G09G 3/003; G03B 35/18; G03B 35/20
See application file for complete search history.

(56) References Cited

U.S. PATENT DOCUMENTS

| 2008/0049151 | A1* | 2/2008 | Vrachan | B29D 11/00596 |
| | | | | 348/744 |
| 2012/0194477 | A1* | 8/2012 | Krah | G02B 27/2292 |
| | | | | 345/175 |
| 2013/0201129 | A1 | 8/2013 | Inamoto et al. | |
| 2014/0201689 | A1* | 7/2014 | Bedikian | G06F 3/011 |
| | | | | 715/863 |
| 2014/0300584 | A1* | 10/2014 | Nishioka | G06F 3/0421 |
| | | | | 345/175 |
| 2015/0363070 | A1* | 12/2015 | Katz | G06F 3/017 |
| | | | | 715/852 |
| 2015/0370415 | A1* | 12/2015 | Takahashi | G06F 3/0421 |
| | | | | 345/175 |
| 2016/0246383 | A1* | 8/2016 | Gan | G06F 1/1694 |

FOREIGN PATENT DOCUMENTS

| JP | WO 2014038303 A1 * | 3/2014 | .......... G06F 3/0421 |
| WO | 2014/038303 A1 | 3/2014 | |
| WO | 2014/073650 A1 | 5/2014 | |

* cited by examiner

Primary Examiner — Nitin Patel
Assistant Examiner — Amen Bogale
(74) Attorney, Agent, or Firm — Xsensus LLP

(57) ABSTRACT

An spatial image display apparatus and method for displaying a spatial image in an aerial space, sensing an object traversing the spatial image, calculating the position of the object's effective centroid, and performing an input operation is disclosed. The spatial image display apparatus detects distances from the object's surface thrust into the aerial display to more precisely determine the position on the spatial image at which the user intends to indicate.

19 Claims, 8 Drawing Sheets

SPATIAL IMAGE DISPLAY APPARATUS AND SPATIAL IMAGE DISPLAY METHOD

FIELD OF THE INVENTION

This present disclosure relates generally to an apparatus and method for forming a spatial image in the air, sensing a position of the display surface of the aerial image the user indicates, and carrying out an input operation.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Air displays are display systems wherein the image is produced in air. Spatial imaging is an image display technique where the presence of a screen is not recognized, or it appears visually dilute, and the image itself exists in space. In combination with the air display, a sensor may be used as a pseudo-touch display to interface with the air display.

A conventional position detection sensor for a touch display determines the position of a user's finger by incorporating a physical sensor. Non-physical methods and sensors are being developed for aerial displays. One embodiment of an effective touch display for aerial displays works by emitting a light, which is radiated to the surface of a finger, and detecting the reflected light. However, the precision of the detected position and the intended position may be inaccurate since the reflective surface of a finger varies based on the cross-sectional area and depth of the finger interfacing with the light. A thick finger may produce a large shift in the intended position, while a thin finger may produce a smaller shift. Also, fingers are generally narrower at the tip; therefore the position sensed by the sensor may differ as the depth in which the finger penetrates the air display. For example, a shallow penetration of a thin fingertip will reflect a different amount of light than a deeper penetration, reflecting light from the pulp of the finger root, thereby resulting in a different position obtained by the sensor.

In a touch display system, the position detected of the finger is the content of an operation indication. In an aerial touch display system, this content changes immediately as the fingertip traverses the sensor, as well as with the depth in which the user penetrates their finger. As a result of the discrepancy in sensing and detecting the accurate representation of the intended position, exact operation of an aerial touch display is difficult.

RELATED ART

Otsubo et al. (1) WO2014038303 A1 is a PCT patent application that relates to an apparatus for forming an aerial image and a physical touch panel for detecting the coordinates of an object indicating a position relative to the aerial image. This disclosure mainly disclosed embodiments of touch panels comprised of physical sensors. Without teaching or providing any details on enablement, the reference appears to mention an embodiment for the position input utilizing infrared rays.

Otsubo et al. (2) WO2014073650 A1 is a PCT patent application that relates to a method for producing a light control panel used in an optical imaging apparatus for forming a three-dimensional image in the air. Multiple embodiments of forming structures comprising surfaces for reflecting light were disclosed and are incorporated by reference.

Inamoto et al. US Pub. No. 2013/0201129 A1 is a patent application that relates to an information processing apparatus including a position detecting unit detecting a contact position at which an input object has touched a touch panel. This disclosure discusses methods for improving accuracy when selecting a user's intended object out of a plurality of objects displayed on a physical touch panel. The physical touch panel senses the pressure of the object or finger on the touch panel and uses the measurement to calculate the indicated spatial position on the display.

SUMMARY

The present invention relates to an spatial image display apparatus and method for displaying a spatial image in an aerial space, sensing an object traversing the spatial image, calculating the position of the object's effective centroid, and performing an input operation. The spatial image display apparatus detects distances from the object's surface thrust into the aerial display to more precisely determine the position on the spatial image at which the user intends to indicate. With such a configuration, the user can more accurately perform the input operation at a point they intend to indicate, even in the case where the object's diameter changes in depth.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
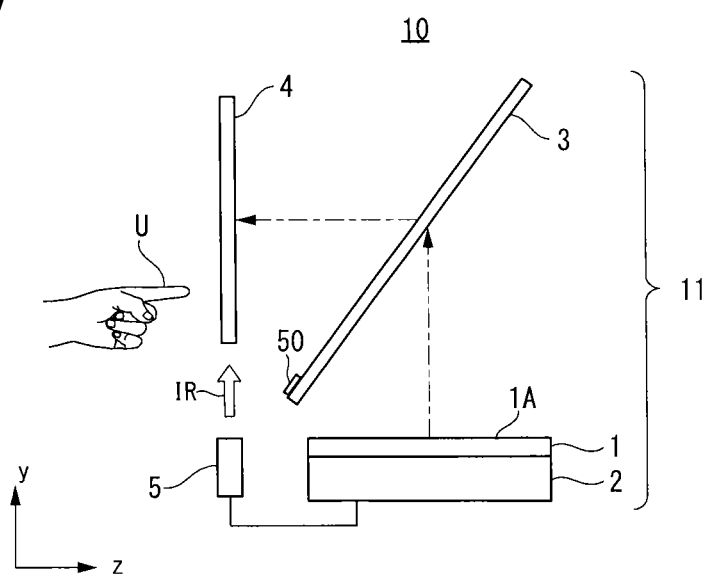
FIG. 1 is a system overview of a spatial image display apparatus according to an exemplary embodiment.

According to an exemplary embodiment, the spatial image display apparatus 10 is comprised of a position detection sensor (sensor) 5 and a spatial image display device 11. According to another exemplary embodiment, the spatial image display apparatus 10 is comprised of a display device 1, a control device 2, an imaging optical system 3, and a sensor 5. The spatial image display device 11 is a combination of the display device 1, the control device 2, and the imaging optical system 3.

The display device 1 may further comprise an image display surface 1A. The display device 1 may be a type of flat display panel, such as a LCD, CRT, LED, plasma display or the like, wherein visible light is emitted in the image display surface 1A, creating an image Ia. In another embodiment, the display device 1 may be curved, wherein the imaging optical system 3 and sensor 5 are also designed to account for the curved geometries.

The imaging optical system 3 reflects the visible light producing image Ia from the image display surface 1A to form image Ib, an aerial spatial image 4 within the spatial image display surface 4P. The imaging optical system 3 is comprised of components similar to "image formation means 12" as described in Otsubo et al. (1) WO2014038303 A1 and Otsubo et al. (2) WO2014073650 A1. In Otsubo et al. (1) and Otsubo et al. (2) the image formation means 12 has a first and a second light control panel, which are positioned either in contact or in proximity with a plurality of first and second band-shaped optical reflection parts, whereby the pathway of light is directed to preserve the image spatially from one plane to another. Multiple embodiments of structures comprising surfaces for reflecting light are disclosed and are incorporated by reference.

In a further embodiment, the imaging optical system 3 may expand the dimensions of the first image, whereby the image on the screen of a smaller device, such as a smart phone, may be expanded to a larger size, while maintaining the image's original aspect ratio. Anyone experienced in the related art would understand how to orient the system to reflect the image as intended.

The sensor 5 detects the position of objects traversing the spatial image display plane (display plane) 4P. The sensor 5 may be a photodetector or optical sensor, such as an infrared ray IR emitter and sensor. The sensor 5 may emit infrared rays IR parallel and/or overlapping with the display plane 4P and detect the reflected light from the surface of the object. In one embodiment, the sensor 5 is comprised of a plurality of photodetectors 5a arranged along the display plane 4P of the spatial image 4. Each photodetector 5a may output infrared rays IR parallel to the display plane 4P of the spatial image 4. As an object traverses the display plane 4P, the sensor 5 detects the rays reflected off of the object and outputs a detection signal according to the photoelectrically converted intensity or light quantity of the reflected rays and the position of the sensed object in the display plane 4P. The sensor 5 also detects objects in an effective display region 4A, which is within the display plane 4P, but outside the spatial image 4.

In another embodiment, more than one object may be detected by the sensor 5 at a time. The detection of multiple objects is useful in performing a "pinch" or "expand" command similar to multi-touch physical trackpad functions on laptops.

The control device 2 receives the signal from the sensor 5 and calculates the position in which the object directed with respect to the display plane 4P of the spatial image 4. The control device 2 then changes the image Ia emitted from the display device 1 based on the detected position. The control device 2 is comprised of a detection signal receiving section (receiver) 21, a position analyzer 22, a main controller 23, a memory storage section (memory) 24, and a display controller 25.

The control device 2 may also comprise of a timer allowing for recording the timing of sensor 5 data. The timer allows for control of timing operations wherein the speed in which the objects are thrust and the duration they remain in the display plane 4P may be considered unique operation inputs or commands. For example, an object traversing the display plane 4P in and out quickly may be considered a different command than holding the object in the display plane 4P for a longer time. These timing and operations may be programmed by the user.

In a further embodiment, a spatial distance variation and a timing tolerance may be programmed for consideration of the intent of maintaining an objects position in the display plane 4P. This programmable tolerance is especially useful for people with hands and fingers that shake. People with Parkinson's disease for instance shake repeatedly and would have difficulty maintaining a fixed position.

The receiver 21 receives the detection signal from the sensor 5. When the detected signal is an electrical analog signal, the receiver 21 performs an analog-digital conversion and outputs a digital signal to the position analyzer 22. When more than one object is detected, the receiver 21 will assign each object an order.

The position analyzer 22 calculates the effective centroid position which the object directed with respect to the display plane 4P of the spatial image 4 based on the detection signal received from the receiver 21. When more than one object is detected, the position analyzer 22 will calculate the effective centroid position of each object.

The main controller 23 is comprised of processors, such as CPU and MPU, and executes computer code programs and uses data stored by the memory 24. The main controller 23 outputs a control signal to the display controller 25 based on the one or more calculated positions.

The memory 24 comprises of rewriteable computer memory including RAM, ROM, flash memory, and the like. The memory 24 stores computer program code and sensor 5 data. In another embodiment, the memory 24 stores historical sensor 5 data to compare to new sensor 5 data.

The display controller 25 receives the control signal from the main controller 23, generates a visible light output to produce an image, and sends the output to the display device 1. Anyone in the experienced in the art will recognize embodiments of display systems and apparatuses to enable the display controller.

In an exemplary embodiment, the spatial image display apparatus may further comprise one or more pseudo-physical buttons 50, 51-53. The functions of the pseudo-physical buttons may be programmed to correspond with operations to control the main power, volume adjustment, or any other function. The pseudo-physical button is a physical feature of the spatial image display apparatus, but it is operably selected by detection of the object by the sensor 5. The pseudo-physical button may be positioned where it can be accessible within the effective display region 4A, but outside the spatial image 4. Thereby, when an object, such as a user's finger U, traverses the display plane 4P, within the effective display region 4A and outside the spatial image 4, as a gesture to push the pseudo-physical button, the sensor 5 will sense the object and the control device 2 will consider this operation as the selection of the button and perform the button command. The pseudo-physical buttons may also be arranged in other positions outside the effective display region 4A, as long as they require the object to traverse the sensor 5.

DETAILED DESCRIPTION OF THE FIGURES

Referring now to the drawings, wherein like reference numerals designate identical or corresponding parts throughout the several views.

FIG. 1 is a system overview of a spatial image display apparatus 10 according to an exemplary embodiment. The spatial image display apparatus 10 is shown in the x direction, a 1st direction, which is parallel to a horizontal surface and perpendicular to a y direction, a 2nd direction, which is also parallel to the horizontal surface, and perpendicular to a z direction, a 3rd direction perpendicular to the horizontal surface, where the z direction is also perpendicular to the y direction.

According to an exemplary embodiment, the spatial image display apparatus 10 is comprised of a display device 1, a control device 2, an imaging optical system 3, and a sensor 5. The imaging optical system 3 forms an aerial spatial image 4 from visible light emitted from image display surface 1A. The sensor 5 detects the position of objects traversing the display plane 4P by emitting infrared rays IR parallel to the display plane 4P, and detecting the reflected light from the surface of the object. An object may be a user's finger U for example. A pseudo-physical button 50 may be positioned on the surface of the imaging optical system 3, where it can be accessible without traversing the spatial image 4.

Figure 2:
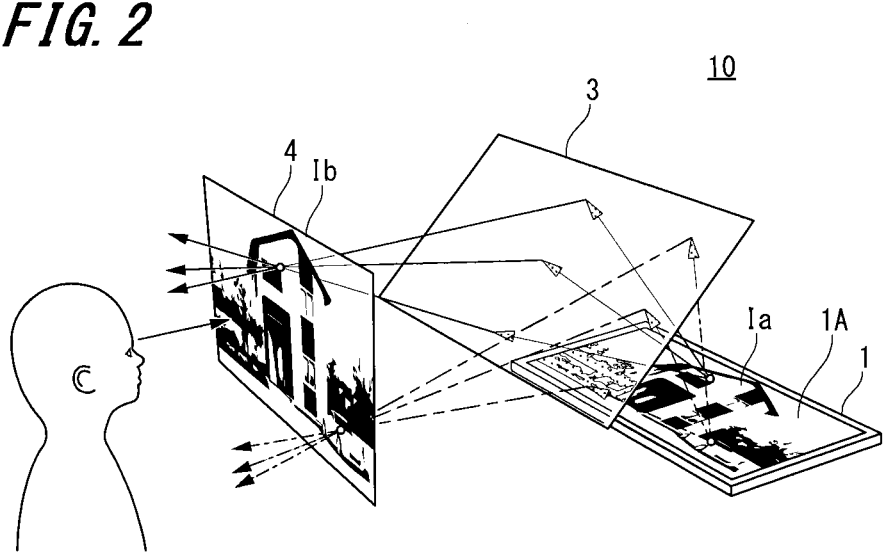
FIG. 2 is a perspective view of the spatial image display apparatus according to an exemplary embodiment.

FIG. 2 is a perspective view of the spatial image display apparatus 10 according to an exemplary embodiment. The display device 1 is shown creating an image Ia within the display surface 1A. The imaging optical system 3 reflects image Ia to form image Ib, which is an aerial spatial image 4, within the display plane 4P.

Figure 3:
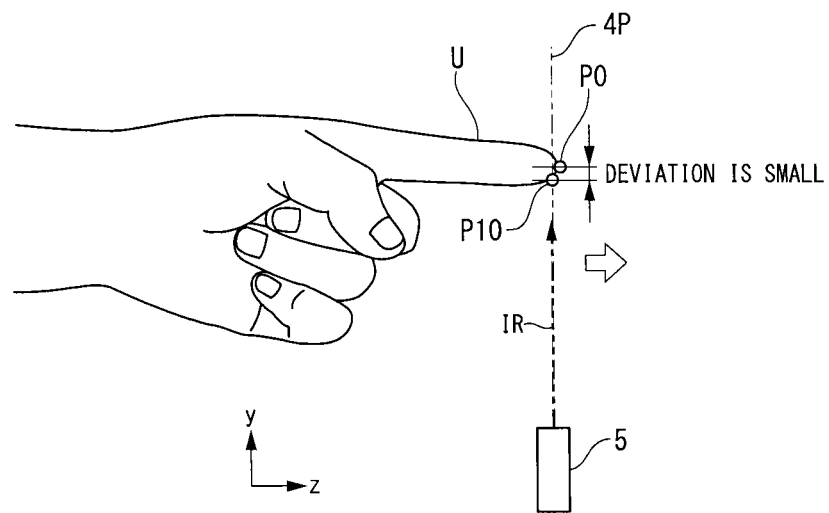
FIG. 3 is a side view in the x direction of a user's finger interfacing with the spatial image, where the deviation detected is small according to an exemplary embodiment.
Figure 4:
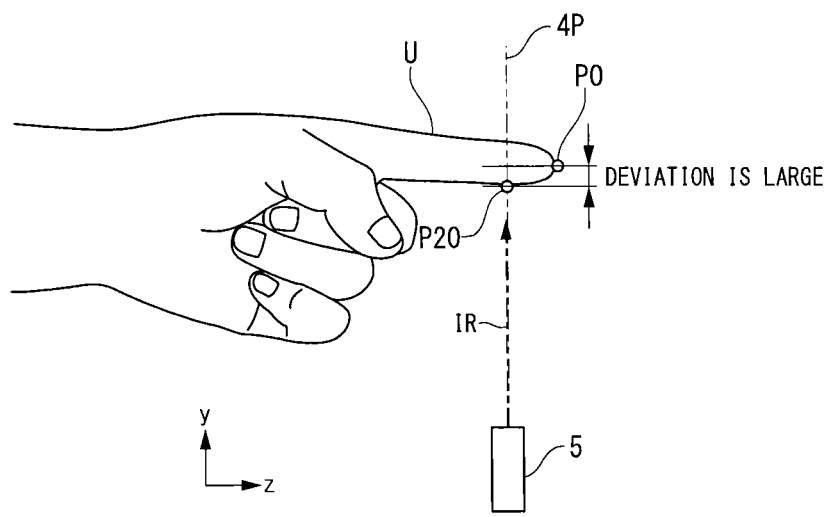
FIG. 4 is a side view in the x direction of a user's finger interfacing with the spatial image, where the deviation detected is large according to an exemplary embodiment.

FIGS. 3 and 4 are side views in the x direction of an object, here shown as a user's finger U, traversing the display plane 4P, according to an exemplary embodiment. The sensor 5 is shown using infrared rays IR to determine the position of the object the user intends to shift in the display plane 4P. Positions comprise of Cartesian coordinates and are determined by objects traversing the display plane 4P. Position P0 is the initial position detected from the object traversing the display plane 4P. As the object further traverses the display plane 4P, new positions will be detected with shifts or deviations from position P0 in the y direction. FIG. 3 shows a shallow penetration of a user's finger U, resulting in a new detected position P10 having a small shift from position P0. FIG. 4 shows a deep penetration of a user's finger U resulting in a new position P20 having a large shift from position P0. The determination of a small or a large shift is relative to the precision of the sensor. However, fine or coarse precision may be programmed or adjusted by the user in either the hardware or software settings in the control device 2 or position analyzer 5.

Figure 5:
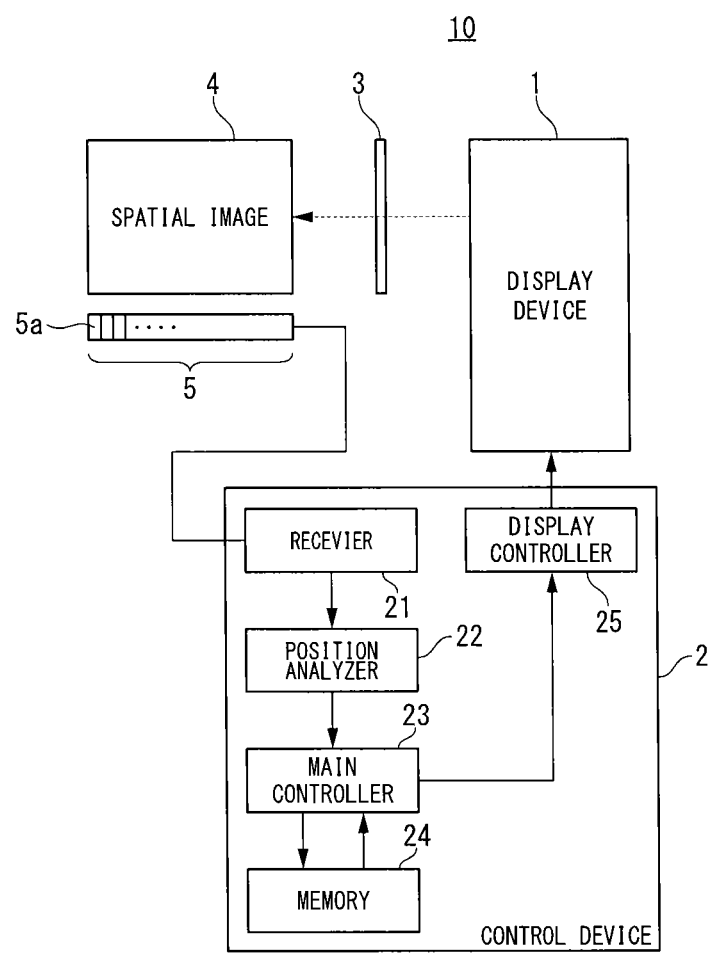
FIG. 5 is a system overview block diagram, which shows the internal structure of the control device according to an exemplary embodiment.

FIG. 5 is a system overview block diagram, which shows the overview of the spatial image display apparatus 10 and the internal structure of the control device 2 according to an exemplary embodiment. The array of photodetectors 5a of the sensor 5 sense an interaction with an object and the display plane 4P of the spatial image 4, and outputs a signal to the receiver 21 of the control device 2. The position analyzer 22 calculates the object position and outputs to the main controller 23, which performs processing on data based on computer code and data stored within the memory 24. Based on the operation indicated, the main controller then outputs a new control signal to the display controller 25.

Figure 6:
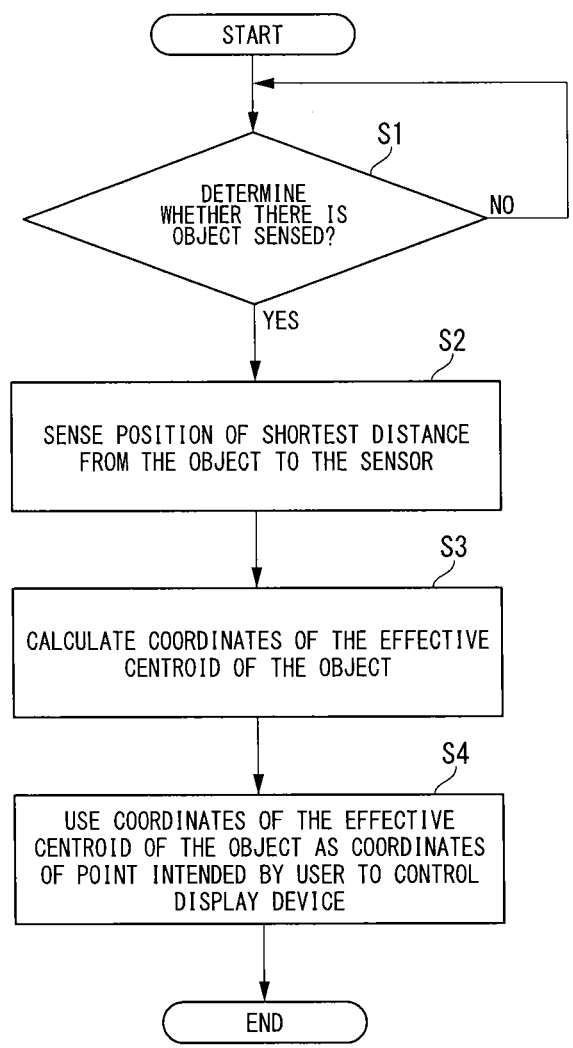
FIG. 6 is a flow diagram of the operation of the control device according to an exemplary embodiment.

FIG. 6 is a flow diagram of the control device 2 operation according to an exemplary embodiment. The position analyzer 22 of the control device 2 receives a detection signal from the sensor 5 through the receiver 21. At step 1 (S1), the position analyzer 22 determines presence of an object based on the receiver 21 signal and any timing thresholds programmed. While no detection occurs, the system does not advance. Once detection occurs, step 2 (S2) initiates the position analyzer 22 to calculate the position on the object with the shortest distance from the sensor 5. The shortest distance position on an object is determined by the greatest intensity or light quantity of reflected light from the object back to the sensor 5. At step 3 (S3), the position analyzer 22 calculates the position having Cartesian coordinates (X, Y) of the effective centroid of the object. Finally at step 4 (S4), the main controller 23 uses the calculated position of the object's effective centroid as the position in which the user intended, as well as any timing thresholds, and controls the display device 1 accordingly. A similar flow diagram is utilized in case of multiple objects sensed, wherein additional steps sensing gestures are also factored as a unique input command.

Figure 7:
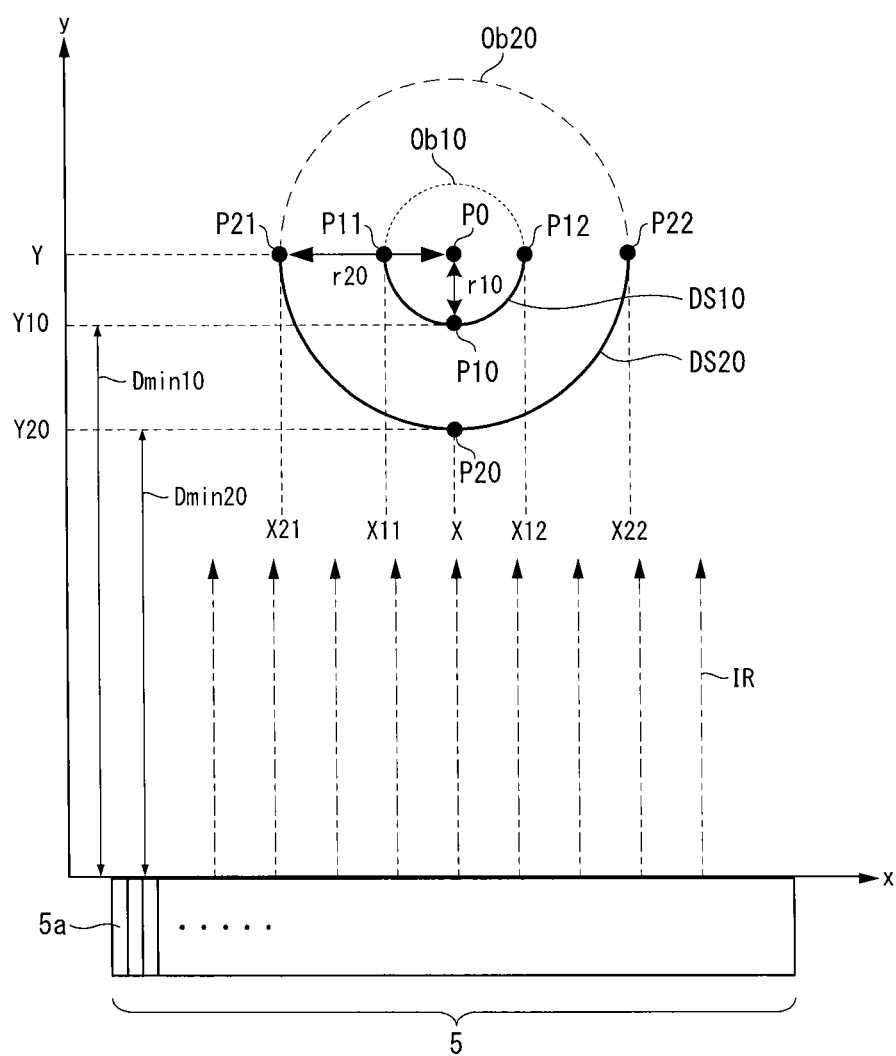
FIG. 7 is an cross-sectional view of two circular objects detected within the display surface of the spatial image according to an exemplary embodiment.

FIG. 7 is an orthogonal and cross-sectional view in the z direction of the objects shown in FIGS. 3 and 4 traversing the display plane 4P of the spatial image 4 according to an exemplary embodiment. Objects Ob10 and Ob20 are shown with their effective cross-sectional shapes plunged into the display plane 4P of the spatial image 4 shallowly and deeply respectively. The sensor 5 is shown with a plurality of photodetectors 5a arranged along the x direction, emitting infrared rays IR in the y direction. Accordingly to an exemplary embodiment, the object may be a user's finger U, wherein its thickness changes with depth resulting in an object with varying cross-sectional areas. The positions and lengths of FIG. 7 are defined as follows.

Object Ob10 represents a circular object such as in FIG. 3 which is traversing the spatial image 4 shallowly, resulting in detection surface DS10. Position P0 is the effective centroid of object Ob10 and has coordinates (X, Y). Position P10 is the point on the detected surface DS10 with the shortest distance to the sensor 5 in the y direction and has coordinates (X, Y10). Y10 is given by length Dmin10. Positions P11 and P12 are the points on the detected surface DS10 at the extremities in the x direction and have coordinates of (X11, Y) and (X12, Y) respectively. The sensor 5 detects the X-Y coordinate of position P10 and the x coordinates of positions P11 and P12. The Y coordinate is calculated by the distance formula and Pythagorean's theorem. The effective length of object Ob10's radius is equal to r10=[|X12−X11|/2]. The coordinate of position P0 in the x direction can be calculated as X=[(X12+X11)/2]. Given position X and length r10, coordinate Y can be calculated by the distance formula and Pythagorean's theorem. Therefore, the coordinate of position P0 in the y direction can be calculated as $Y=[Y10+r10]$, and thereby the coordinates of the centroid of object Ob10 is determined.

Object Ob20 represents a circular object such as in FIG. 4 which is traversing the spatial image 4 deeply, resulting in detection surface DS20. Position P0 is the effective centroid of object Ob20 and has coordinates (X, Y). Position P20 is the point on the detected surface DS20 with the shortest distance to the sensor 5 in the y direction and has coordinates (X, Y20). Y20 is given by length Dmin20. Positions P21 and P22 are the points on the detected surface DS20 at the extremities in the x direction and have coordinates of (X21, Y) and (X22, Y) respectively. The effective length of object Ob20's radius is equal to $r20=[|X22-X21|/2]$. The coordinate of position P0 in the x direction can be calculated as $X=[(X22+X21)/2]$. Given position X and length r20, coordinate Y can be calculated by the distance formula and Pythagorean's theorem. Therefore, the coordinate of position P0 in the y direction can be calculated as $Y=[Y20+r20]$, and thereby the coordinates of the centroid of object Ob20 is determined.

Figure 8:
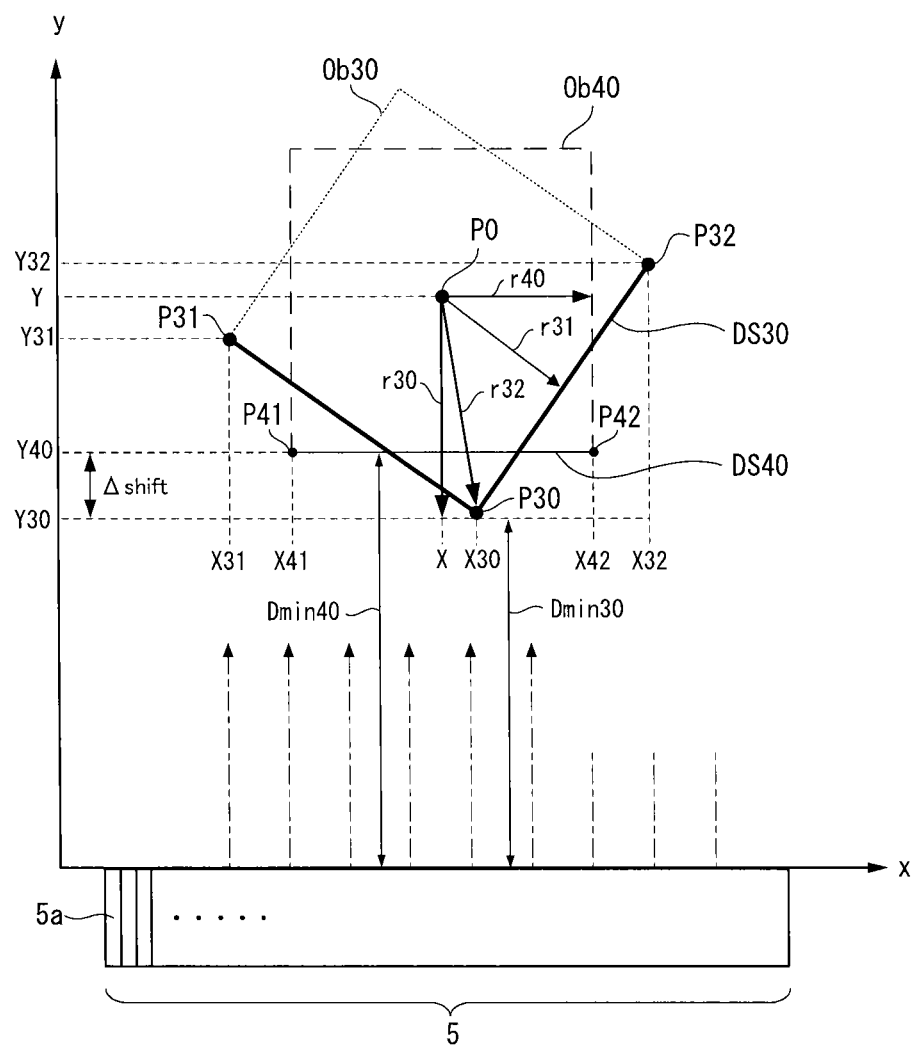
FIG. 8 is an cross-sectional view of two square objects detected within the display surface of the spatial image according to an exemplary embodiment.

FIG. 8 is an orthogonal and cross-sectional view in the z direction of two square objects traversing the display plane 4P of the spatial image 4 according to an exemplary embodiment. Objects Ob30 and Ob40 have identical side lengths and are shown with their effective cross-sectional shapes plunged into the display plane 4P of the spatial image 4, and their sides tilted and aligned with the x and y axes respectively. The sensor 5 is shown with a plurality of photodetectors 5a arranged along the x direction, emitting infrared rays IR in the y direction. The positions and lengths of FIG. 8 are defined as follows.

Object Ob30 represents a square object which is traversing the spatial image 4 with sides not aligned with the x and y axes, resulting in detection surface DS30. Position P0 is the effective centroid of object Ob30 and has coordinates (X, Y). Position P30 is the point on the detected surface DS30 with the shortest distance to the sensor 5 in the y direction and has coordinates (X30, Y30). Positions P31 and P32 are the points on the detected surface DS30 at the extremities in the x direction and have coordinates of (X31, Y31) and (X32, Y32) respectively. The sensor 5 can detect the x coordinates of P31 and P32. Length r30 represents the distance in the y direction between the centroid position P0 and position P30.

The coordinates for position P0 may be determined by calculating the lengths to the midpoint of positions P31 and P32 in each x and y directions and adding those distances to the coordinates with the lowest positions. Length r31 represents the distance from the centroid position P0 to the side of object Ob30, and can be calculated as half of the distance between position P31 and P32 using the basic distance formula. Length r32 represents the distance from the centroid position P0 to the corner of object Ob30. For square objects, it is known through basic geometry that length r32 is equal to $[(\sqrt{2})*r31]$. The coordinate of position P0 in the x direction can be calculated as $X=[(X32+X31)/2]$. Given position X, and length r32, length r30 can be calculated by Pythagorean's theorem. Therefore, the coordinate of position P0 in the y direction can be calculated as $Y=[Y30+r30]$, and thereby the coordinates of the centroid of object Ob30 is determined.

Object Ob40 represents a square object which is traversing the spatial image 4 with sides aligned with the x and y axes, resulting in detection surface DS40. Position P0 is the effective centroid of object Ob40 and has coordinates (X, Y). The entire detection surface DS40 has the same distance Dmin40 to the sensor 5 in the y direction. Positions P41 and P42 are the points on the detected surface DS40 at the extremities in the x direction and have coordinates of (X41, Y40) and (X42, Y40) respectively. The sensor 5 can detect the coordinates of each position P41 and P42. Length r40 represents the distance between the centroid position P0 and the side of the object Ob40; however the coordinates for position P0 are unknown. The coordinate of position P0 in the x direction can be calculated as $X=[(X42+X41)/2]$. Given position X, and length r40 can be calculated by Pythagorean's theorem. Therefore, the coordinate of position P0 in the y direction can be calculated as $Y=[Y40+r40]$, and thereby the coordinates of the centroid of object Ob40 is determined.

When a square object rotates, P30 becomes the closest position with the sensor 5 and r30 becomes big. At the same time, P31 and P32 expand in the x direction; therefore (X32−X31) also becomes larger. As a result, the differences due to rotation are offset.

Figure 9:
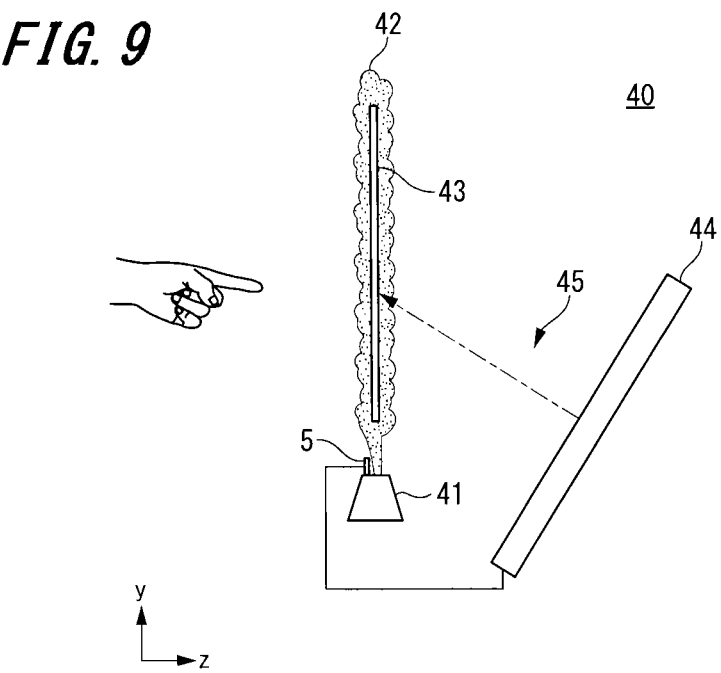
FIG. 9 is a side view of a spatial image display apparatus comprising a fog generator and fog according to an exemplary embodiment.

FIG. 9 is a side view in the x direction of a spatial image display apparatus 40 comprising a projector 44, a sensor 5, a fog generator 41, and fog 42 according to an exemplary embodiment. In a further exemplary embodiment, the fog generator 41 may generate the fog 42 to flow upwards from the bottom and within the display plane of the spatial image 43. In another exemplary embodiment, the fog generator 41 may be configured to generate fog 42 to flow downwards to the bottom, while still encompassing the spatial image 43. The projector 44 projects visible light 45 into the fog 42, forming the spatial image 43 within the fog 42. The projector 44 may be comprised of a functional equivalent means as the control device 2, as well as have a different form than the display device 1. Thus, the spatial image display apparatus 40 of this disclosure may be multiple variations of a single unit which forms a spatial image in an aerial space.

Figure 10:
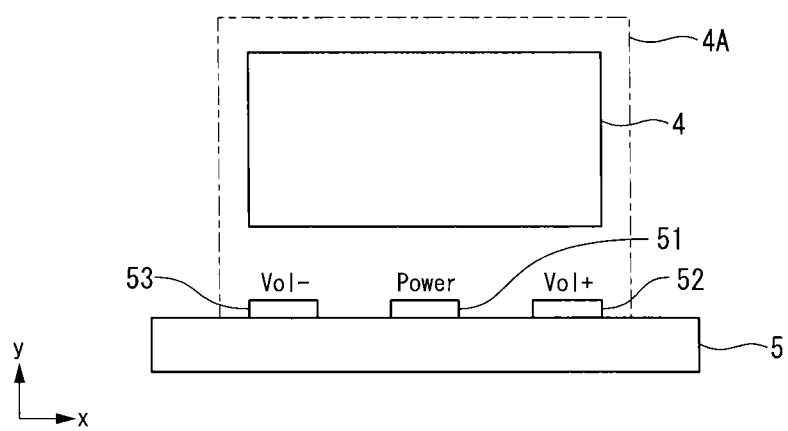
FIG. 10 is a front view of the spatial image, the effective display region, and the relative locations of pseudo-physical buttons according to an exemplary embodiment.

FIG. 10 is a front view in the z direction of the spatial image, the effective display region 4A, and the relative locations of pseudo-physical buttons 51-53 according to an exemplary embodiment. Three pseudo-physical buttons are shown with functions corresponding with operations to control the main power, volume adjustment; however, they may also be any other programmed function. Given the aerial nature of the spatial image 4, physical buttons cannot be integrated in the display. Moreover, a physical button cannot obstruct the optical pathway of the sensor 5. Therefore, operation buttons without physical restrictions within the display is preferred. The pseudo-physical buttons in the figure are provided on the opposite side to a user across the plane of the spatial image 4.

The location of the pseudo-physical button is preferred outside of the spatial image 4, but may include the effective display region 4A. As shown in FIG. 10, the pseudo-physical buttons 51-53 are arranged in the position corresponding to the effective display region 4A below the spatial image 4. The pseudo-physical buttons may also be arranged in other positions as previously described.

Figure 11:
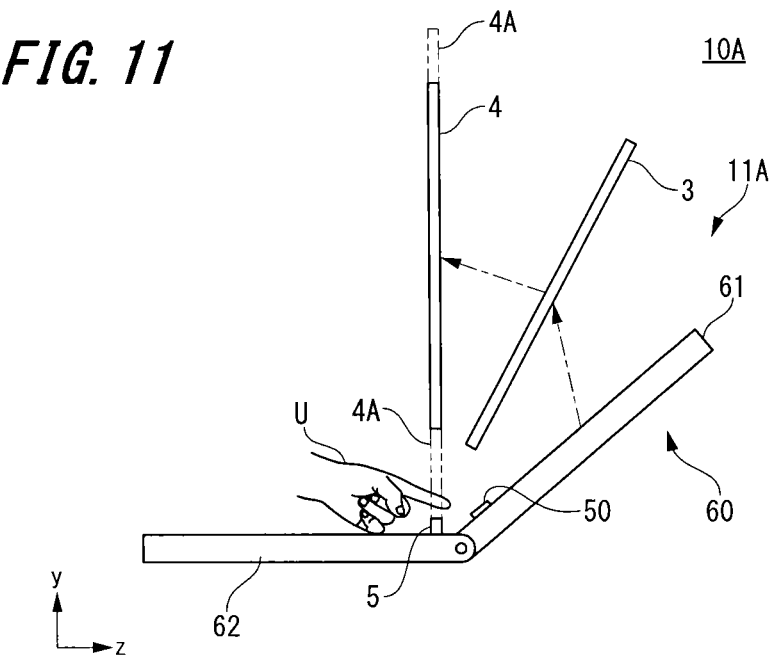
FIG. 11 is a side view of the spatial image display apparatus incorporated with a notebook computer according to an exemplary embodiment.

FIG. 11 is a side view in the x direction of the spatial image display apparatus 10A comprising a notebook computer 60, the imaging optical system 3, the sensor 5, and a pseudo-physical button 50, according to an exemplary embodiment. The notebook computer 60 further comprises a notebook computer display 61 and a notebook computer body 62, connected by a hinge, and wherein the notebook computer 60 may further comprise of other computer parts, such as a keyboard, mouse, trackpad, speakers, camera, or any other typical computer parts.

The sensor 5 is shown located on the notebook computer body 62 near the hinge where the notebook computer body 62 is connected to the notebook computer display 61. The network computer may also be of the form of a tablet computer where the notebook computer display 61 and the notebook computer body 62 may be physically separated. The imaging optical system 3 is comprised so that it may be arranged in the front surface of the notebook computer display 61. Together the notebook computer display 61 and the imaging optical system 3 constitutes the spatial image display device 11A. The notebook computer body 62 may comprise of the functional equivalent to the control device 2 including the control device's internal structure as described in FIG. 5. The imaging optical system 3 may be integrated with the notebook computer such that it may fold out and back into the notebook computer when not in use.

The pseudo-physical button 50 is shown located on the notebook computer body 62 near the hinge where the notebook computer body 62 connects to the notebook computer display 61. The pseudo-physical button 50 may be positioned at the immediate inner side of the effective display region 4A, where the button can be accessible without traversing the spatial image 4. Thereby, as shown in FIG. 11, when an object, such as a user's finger U, traverses the display plane 4P, within the effective display region 4A and outside the spatial image 4 as a gesture to push the pseudo-physical button 50, the sensor 5 will sense the object and the notebook computer 60 will consider this operation as the selection of the button and perform the button command.

Figure 12:
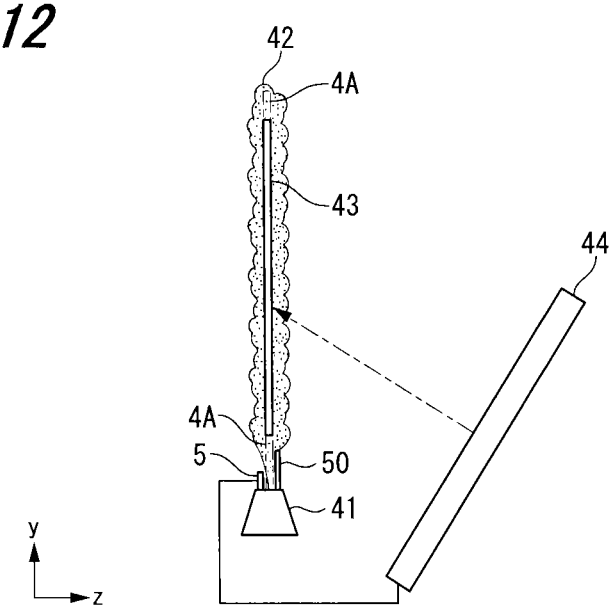
FIG. 12 is a side view of a spatial image display apparatus comprising a fog generator, fog, and a pseudo-physical button according to an exemplary embodiment.

FIG. 12 is a side view in the x direction of a spatial image display apparatus comprising a projector 44, a sensor 5, a fog generator 41, fog 42 and a pseudo-physical button 50 according to an exemplary embodiment. The sensor 5 is shown in the z direction directly in front of the fog generator 41, while the pseudo-physical button 50 is shown in the z direction directly behind the fog 42, which is generally in the display plane 4P. The user will still be able to see the pseudo-physical buttons through the fog 42. The projector 44 may comprise of the functional equivalent to the control device 2 including the control device's internal structure as described previously.

Similar as the system described by FIG. 11, when an object, such as a user's finger U, traverses the display plane 4P, within the effective display region 4A and outside the spatial image 4, as a gesture to push the pseudo-physical button 50, the sensor 5 will sense the object and the projector 44 will consider this operation as the selection of the button and perform the button command.

Obviously, numerous modifications and variations of the present invention are possible in light of the above teachings. It is therefore to be understood that within the scope of the appended claims, the invention may be practiced otherwise than as specifically described herein.

The invention claimed is:

1. A spatial image display apparatus, comprising:
a fog generator configured to generate fog that flows along a display plane in an aerial space;
a spatial image display device configured to emit visible light into the fog to form a spatial image in the display plane;
a sensor configured to generate a signal corresponding to a position of an object traversing the spatial image; and
circuitry configured to:
receive the signal, and
determine the position of the object with respect to the display plane according to a spatial distance variation and a programmable timing tolerance, wherein the spatial distance variation and the programmable timing tolerance are set so that the circuitry determines the position of the object even if the object experiences a predetermined amount of shaking;
wherein a detection of the object traversing the display plane outside of the spatial image and opposite of a pseudo-physical button is considered a unique input command.

2. The spatial image display apparatus of claim 1, wherein the spatial image display device further comprises:
a display device configured to emit the visible light; and
an imaging optical system reflecting the visible light into the aerial space, and
the circuitry is configured to calculate a position of an effective centroid of the object.

3. The spatial image display apparatus of claim 2, wherein the circuitry is further configured to calculate the position of the effective centroid of the object based on a lesser of: a maximum length of the object in a x direction; and a maximum length of the object in a y direction.

4. The spatial image display apparatus of claim 2, wherein the circuitry further comprises a timer configured to record timing of the signal to indicate an operation command.

5. The spatial image display apparatus of claim 2, wherein the circuitry further comprises:
a receiver configured to perform an analog-to-digital conversion on the signal;
a position analyzer configured to generate the position of the effective centroid of the object;
a main controller;
a memory configured to store executable code and data; and
a display controller configured to generate the visible light.

6. The spatial image display apparatus of claim 1, further comprising a pseudo-physical button.

7. The spatial image display apparatus of claim 1, wherein the sensor further comprises a plurality of light ray emitters and detectors arranged along the display plane,
each light ray emitter emits light rays parallel and adjacent to the display plane,
the signal corresponds to an intensity detected by each of the detectors of the light rays reflecting off the object traversing the display plane, and
the signal corresponds to a distance between the object and the sensor.

8. The spatial image display apparatus of claim 1, further comprising a notebook computer.

9. A method comprising:
generating fog that flows along a display plane in an aerial space;
emitting a visible light into the fog to form a spatial image in the display plane;
detecting a position, of an object traversing the spatial image, according to a spatial distance variation and a programmable timing tolerance;
calculating an effective centroid position of the object based on the detected position; and
identifying an input command based on the effective centroid position, wherein
the spatial distance variation and the programmable timing tolerance are set so that the position of the object is detected even if the object experiences a predetermined amount of shaking;
wherein a detection of the object traversing the display plane outside of the spatial image and opposite of a pseudo-physical button is considered a unique input command.

10. The method of claim 9, wherein a detection of more than one object is considered a unique input command.

11. The method of claim 9, wherein a timing of the object traversing the display plane outside of the spatial image is considered a unique input command.

12. The method of claim 9, wherein the effective centroid position is calculated based on a lesser of:
   a maximum length of the object in a x direction; and
   a maximum length of the object in a y direction.

13. The method of claim 9, wherein
   the visible light is emitted by a plurality of light ray emitters and detectors arranged along the display plane, and
   the method further comprises:
      detecting, by the detectors, intensity values of the light rays reflecting off the object traversing the display plane; and
      calculating the effective centroid position according to the intensity values.

14. A non-transitory computer-readable medium storing computer executable instructions which, when executed by an information processing apparatus, causes the information processing apparatus to:
   control a fog generator to generate fog that flows along a display plane in an aerial space;
   control a spatial image display device to emit a visible light into the fog to form a spatial image in the display plane;
   calculate an effective centroid position of an object traversing the spatial image based on a position of the object, the position of the object being detected according to a spatial distance variation and a programmable timing tolerance; and
   identify an input command based on the effective centroid position, wherein
   the spatial distance variation and the programmable timing tolerance are set so that the effective centroid position of the object is calculated even if the object experiences a predetermined amount of shaking;
   wherein a detection of the object traversing the display plane outside of the spatial image and opposite of a pseudo-physical button is considered a unique input command.

15. The non-transitory computer-readable medium of claim 14, wherein the information processing apparatus is further caused to:
   identify the input command based on an amount of time the object is sensed traversing the display plane.

16. The non-transitory computer-readable medium of claim 14, wherein the information processing apparatus is further caused to:
   calculate a change in the position of the effective centroid of the object; and
   identify the input command based on the change in a predetermined amount of time.

17. The non-transitory computer-readable medium of claim 14, wherein the information processing apparatus is further caused to:
   calculate effective centroid positions of more than one object traversing the display plane based on detected positions of the objects; and
   identify the input command based on the effective centroid positions of each object.

18. The non-transitory computer-readable medium of claim 14, wherein the effective centroid position is calculated based on a lesser of:
   a maximum length of the object in a x direction; and
   a maximum length of the object in a y direction.

19. The non-transitory computer-readable medium of claim 14, wherein
   the visible light is emitted by a plurality of light ray emitters and detectors arranged along the display plane, and
   the information processing apparatus is further caused to:
      detecting, by the detectors, intensity values of the light rays reflecting off the object traversing the display plane; and
      calculating the effective centroid position according to the intensity values.

* * * * *